United States Patent
Sanuki et al.

(10) Patent No.: US 10,355,280 B2
(45) Date of Patent: Jul. 16, 2019

(54) MANUFACTURING METHOD OF CARBOXYMETHYL CELLULOSE SALT FOR ELECTRODE OF NONAQUEOUS ELECTROLYTE SECONDARY BATTERY, ELECTRODE FOR NONAQUEOUS ELECTROLYTE SECONDARY BATTERY, AND NONAQUEOUS ELECTROLYTE SECONDARY BATTERY

(71) Applicant: DAI-ICHI KOGYO SEIYAKU CO., LTD., Kyoto (JP)

(72) Inventors: Atsushi Sanuki, Kyoto (JP); Masanori Ohzaki, Kyoto (JP); Miho Shibata, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 346 days.

(21) Appl. No.: 15/503,718

(22) PCT Filed: Jul. 23, 2015

(86) PCT No.: PCT/JP2015/070944
§ 371 (c)(1),
(2) Date: Feb. 14, 2017

(87) PCT Pub. No.: WO2016/031449
PCT Pub. Date: Mar. 3, 2016

(65) Prior Publication Data
US 2017/0256799 A1  Sep. 7, 2017

(30) Foreign Application Priority Data
Aug. 28, 2014  (WO) .................. PCT/JP2014/072525

(51) Int. Cl.
*H01M 4/62* (2006.01)
*H01M 4/587* (2010.01)
*C09D 5/24* (2006.01)
*C08B 11/12* (2006.01)
*C09D 101/28* (2006.01)

(52) U.S. Cl.
CPC ............ *H01M 4/622* (2013.01); *C08B 11/12* (2013.01); *C09D 5/24* (2013.01); *C09D 101/286* (2013.01); *H01M 4/587* (2013.01); *H01M 2220/30* (2013.01)

(58) Field of Classification Search
CPC ....... C08B 11/12; C09D 101/286; C09D 5/24; H01M 2220/30; H01M 4/587; H01M 4/622
See application file for complete search history.

(56) References Cited

FOREIGN PATENT DOCUMENTS

| | | |
|---|---|---|
| CN | 1335856 | 2/2002 |
| CN | 1717419 | 1/2006 |
| CN | 101985479 | 3/2011 |
| JP | 2000-082472 | 3/2000 |
| JP | 2000-264901 | 9/2000 |
| JP | 2005-255799 | 9/2005 |
| JP | 2005255799 A * | 9/2005 |
| JP | 2006-348138 | 12/2006 |
| JP | 2008-231186 | 10/2008 |
| JP | 2009-144027 | 7/2009 |
| JP | 2009144027 A * | 7/2009 |
| JP | 2009-191233 | 8/2009 |
| JP | 2010-070686 | 4/2010 |
| JP | 2011-063673 | 3/2011 |
| JP | 5514734 | 6/2014 |
| JP | 2014-133825 | 7/2014 |
| WO | 2010061871 | 6/2010 |

OTHER PUBLICATIONS

JP-2005255799-A machine translation (Year: 2019).*
JP-2009144027-A machine translation (Year: 2019).*
"Office Action of China Counterpart Application," dated Sep. 27, 2018, with English translation thereof, p. 1-p. 14.
"International Search Report (Form PCT/ISA/210) of PCT/JP2015/070944", dated Aug. 18, 2015, with English translation thereof, pp. 1-4.

* cited by examiner

Primary Examiner — Lingwen R Zeng
(74) Attorney, Agent, or Firm — JCIPRNET

(57) ABSTRACT

A manufacturing method which includes: (1) an alkali cellulose reaction step wherein a mixed solvent having a mixing ratio (a mass ratio) of an alcohol having a carbon number of 3 or less and water of 75:25 to 95:5 is used, and the concentration of the base to the water is 25 to 40 mass %; (2) an etherification reaction step wherein a reaction is carried out under an excess base of 0.2 to 0.5 moles per unit of an anhydroglucose of the cellulose; (3) a neutralization step wherein acid is added to adjust the pH of the reaction mixture to 6.0 to 8.0; and (4) a heating step wherein the mixed solvent is removed, and a base is added to adjust the pH of the reaction mixture to 8.0 to 9.0, and then a heat treatment is performed at 40 to 70° C. for 30 to 120 minutes.

4 Claims, No Drawings

MANUFACTURING METHOD OF CARBOXYMETHYL CELLULOSE SALT FOR ELECTRODE OF NONAQUEOUS ELECTROLYTE SECONDARY BATTERY, ELECTRODE FOR NONAQUEOUS ELECTROLYTE SECONDARY BATTERY, AND NONAQUEOUS ELECTROLYTE SECONDARY BATTERY

CROSS-REFERENCE TO RELATED APPLICATION

This application is a 371 of international application of PCT application serial no. PCT/JP2015/070944, filed on Jul. 23, 2015, which claims the priority benefits of international PCT application serial no. PCT/JP2014/072525, filed on Aug. 28, 2014. The entirety of each of the abovementioned patent applications is hereby incorporated by reference herein and made a part of this specification.

BACKGROUND OF THE INVENTION

Field of the Invention

The invention relates to a manufacturing method of carboxymethyl cellulose salt for the electrode of a nonaqueous electrolyte secondary battery.

Description of Related Art

In recent years, electronic machines, in particular portable devices such as mobile phones, personal digital assistants (PDAs), and notebook computers have become smaller, lighter, thinner, and more powerful, and portable devices are becoming more popular. As the application scope of such portable devices is diversified, the battery driving these portable devices has become a very important component. In a battery, the lithium ion secondary battery representative of the nonaqueous electrolyte secondary battery is extensively applied, and the lithium ion secondary battery has high energy density and high capacity.

In general, a nonaqueous electrolyte secondary battery is made by the following method. That is, the negative electrode and the positive electrode are respectively formed into thin films on the metal foil surface used as the current collector substrate (current collector) to form a thin film positive electrode and a thin film negative electrode, and the negative electrode contains a negative electrode active material formed by, for instance, a carbon material that can adsorb and release lithium ions, and the positive electrode contains a positive electrode active material formed by lithium-containing transition metal composite oxide (such as $LiCoO_2$, $LiNiO_2$, or $LiMn_2O_4$). Moreover, the thin film positive electrode and the thin film negative electrode are rolled or laminated with an isolation film that is also forming into a thin film between the two, and the rolled body or the laminated body is housed in the casing. The thin film positive electrode and the thin film negative electrode have the structures of a metal foil and mixture layer and are formed by coating and drying a negative electrode active material slurry (or paste) or a positive electrode active material slurry (or paste) on a current collector material, and the metal foil is a current collector substrate (current collector), and the mixture layer is formed on the metal foil surface and contains an active material.

Regarding the negative electrode, a method to conveniently manufacture the aqueous paste in which the aqueous paste does not contain a surfactant or a dispersant and only water-soluble polymer particles are present such that water-insoluble inorganic particles are evenly dispersed in the water and gel production is inhibited is as disclosed in patent literature 1. Specifically, after water-insoluble inorganic particles (in particular carbon material particles such as graphite) and water-soluble polymer particles (in particular particles of carboxymethyl cellulose or a salt thereof) are dry blended, the mixture is mixed with water to form an aqueous paste (in particular paste for the negative electrode material of a lithium ion battery), wherein the ratio of the average particle size of the water-insoluble inorganic particles and the average particle size of the water-soluble polymer particles is adjusted to former/latter=1/3 to 1/0.05 (in particular 1/2 to 1/0.1). According to the literature, the ratio of the average particle size of the water-insoluble inorganic particles and the average particle size of the water-soluble polymer particles is set to 1/3 to 1/0.05, and even if water-soluble polymer particles having higher viscosity (in particular carboxymethyl cellulose salt particles) are used, an aqueous paste inhibiting gel production and for which the particles are uniformly dispersed can still be made; the means of controlling the average particle size of the water-soluble polymer particles is a method in which the following pulverizers are used for pulverization, such as: sample mill, hammer mill, turbo mill, atomizer, cutter mill, bead mill, ball mill, roll mill, jet mill.

Moreover, the following carboxymethyl cellulose or a salt thereof is disclosed (patent literature 2) to prevent potential defects such as streaks and pinholes in the resulting electrode beforehand when used as the binder of the electrode of the nonaqueous electrolyte secondary battery. When 2 L of 0.3 mass % aqueous solution of the carboxymethyl cellulose or a salt thereof of dry mass B is first prepared, and the aqueous solution is completely filtered using a 250-mesh filter under a reduced pressure condition of −200 mmHg, and a dry mass A of the residue on the filter after filtering is measured, the ratio of dry mass A to dry mass B is less than 50 ppm. The literature recites that, if an aqueous solution of the current carboxymethyl cellulose or a salt thereof is prepared, then colloidal particles from the carboxymethyl cellulose or a salt thereof remain in the aqueous solution as undissolved substance, but mechanical dry or wet pulverization treatment is performed on the carboxymethyl cellulose or a salt thereof, and in the aqueous solution of the product of the mechanical pulverization treatment of the carboxymethyl cellulose or a salt thereof, the colloidal particles are micronized. The result is that, if an electrode is formed using the aqueous solution of the product of the mechanical pulverization treatment of the carboxymethyl cellulose or a salt thereof, then large undissolved substance can be inhibited, wherein the undissolved substance causes streak defects, peeling, or pinholes . . . etc. on the electrode surface.

Patent literature 1: JP 2011-63673
Patent literature 2: JP 5514734

SUMMARY OF THE INVENTION

Technical Issues to be Solved

In general, the size of the undissolved component is decided by the particle size of the carboxymethyl cellulose or a salt thereof, and therefore undissolved components having a certain particle size or more can be reduced via micronization using mechanical pulverization. In particular, the dissolution rate of the carboxymethyl cellulose or a salt thereof having a smaller particle size toward water is increased, and therefore the electrode active material can appear to be dispersed in a short amount of time.

However, the agglutination of the active material particle cannot in actuality be completely destroyed, and therefore the active material cannot be sufficiently dispersed in the water such that gaps are present, and the gap portions may be the main cause for spots when the electrode paste is coated on copper foil or aluminum foil.

Moreover, if a long dispersion step is continued for sufficient destruction, then the following issue occurs: the adhesive strength of the electrode of the copper foil or aluminum foil or the adhesive strength between the active materials is reduced, such that battery life is reduced.

Therefore, a carboxymethyl cellulose salt for the electrode of a nonaqueous electrolyte secondary battery with the following properties is desired: prevention of defects such as streaks or pinholes on the electrode coating surface; and excellent adhesive strength to the current collector or between the active materials.

Technical Means

To solve the above issues, the inventors have conducted research to a manufacturing method of carboxymethyl cellulose salt that is not dependent on the particle size of carboxymethyl cellulose salt and can make the solubility of carboxymethyl cellulose salt to water constant. The results showed that the manufacture of carboxymethyl cellulose salt under specific conditions can solve the above issues, thereby completing the invention. That is, the first object of the invention is a manufacturing method of carboxymethyl cellulose salt for the electrode of a nonaqueous electrolyte secondary battery in which an etherification reaction is performed after an alkali cellulose reaction of a base and cellulose. A feature of the manufacturing method of carboxymethyl cellulose salt for the electrode of a nonaqueous electrolyte secondary battery is that, the following steps are included:

(1) an alkali cellulose reaction step in which a mixed solvent having a mixing ratio (mass ratio) of 75:25 to 95:5 of alcohol having a carbon number of 3 or less and water is used, and the concentration of the base to the water is 25 mass % to 40 mass %;

(2) an etherification reaction step in which a reaction is carried out under an excess base of 0.2 moles to 0.5 moles per unit of an anhydroglucose of the cellulose;

(3) a neutralization step in which an acid is added after the etherification reaction is complete to adjust the pH of the reaction mixture to 6.0 to 8.0; and (4) a heating step in which the mixed solvent is removed after the neutralization step is complete, and a base is added to adjust the pH of the reaction mixture to 8.0 to 9.0, and then a heat treatment is performed at 40° C. to 70° C. for 30 minutes to 120 minutes.

The manufacturing method of the invention preferably the mixing ratio (mass ratio) of the alcohol having a carbon number of 3 or less and the water is 80:20; the concentration of the base to the water is 27.3 mass % to 35.5 mass %; the excess base per unit of the anhydroglucose is 0.24 moles to 0.34 moles; in the neutralization step, the pH is adjusted to 7.5; in the heating step, a treatment temperature is 50° C. to 60° C. and the treatment time is 60 minutes to 90 minutes; and a pH in the heating step is 8.0 to 8.5.

The second object of the invention is an electrode for a nonaqueous electrolyte secondary battery formed by the following method: the carboxymethyl cellulose salt obtained by the manufacturing method above and an electrode active material are dry mixed, then water is added to disperse the electrode active material in the water, and a binder is added to form an electrode paste, and then the electrode paste is coated on a current collector. The third object of the invention is a nonaqueous electrolyte secondary battery having the electrode for a nonaqueous electrolyte secondary battery.

<Efficacies>

According to the invention, a carboxymethyl cellulose salt can be made, and the carboxymethyl cellulose salt can prevent defects such as streaks or pinholes on the electrode coating surface and achieve excellent adhesive strength to the current collector and between active materials.

DESCRIPTION OF THE EMBODIMENTS

The invention is the manufacturing method of carboxymethyl cellulose salt for the electrode of a nonaqueous electrolyte secondary battery in which an etherification reaction is performed after the alkali cellulose reaction of a base and cellulose, and the manufacturing method of carboxymethyl cellulose salt for the electrode of a nonaqueous electrolyte secondary battery contains the following reaction steps. Each reaction step is described in detail below.

(1) An alkali cellulose reaction step in which a mixed solvent having a mixing ratio (mass ratio) of 75:25 to 95:5 of alcohol having a carbon number of 3 or less and water is used, and the concentration of the base to the water is 25 mass % to 40 mass %;

(2) an etherification reaction step in which a reaction is carried out under an excess base of 0.2 moles to 0.5 moles per unit of an anhydroglucose of the cellulose;

(3) a neutralization step in which an acid is added after the etherification reaction is complete to adjust the pH of the reaction mixture to 6.0 to 8.0;

(4) a heating step in which the mixed solvent is removed after the neutralization step is complete, and a base is added to adjust the pH of the reaction mixture to 8.0 to 9.0, and then a heat treatment is performed at 40° C. to 70° C. for 30 minutes to 120 minutes.

(1) Alkali Cellulose Reaction Step

The manufacturing method of carboxymethyl cellulose salt by an alkali cellulose reaction includes a water medium method and a solvent method, and a solvent method is used in the invention.

A mixed solvent of alcohol having a carbon number of 3 or less and water is used as the reaction solvent.

The alcohol having a carbon number of 3 or less is not particularly limited, and specifically can include, for instance: methanol, ethanol, n-propanol, and isopropanol. The alcohols can be used alone or in a mixture of 2 or more. In particular, from the perspective of miscibility with water, one or both of methanol and isopropanol are preferably used.

The mixing ratio (mass ratio) of alcohol having a carbon number of 3 or less and water is 75:25 to 95:5, preferably 80:20. If the alcohol having a carbon number of 3 or less is less than 75 mass %, then the concentration of the base in the reaction system is too low and the effective utilization rate of the etherifying agent for carboxymethylation is reduced, which is undesirable. Moreover, if the alcohol having a carbon number of 3 or less exceeds 95 mass %, then the moisture content in the reaction system is insufficient and the base cannot be completely dissolved, such that uneven reaction readily occurs, which is undesirable.

Based on water, the concentration of the base in the reaction solvent during the alkali cellulose reaction is 25 mass % to 40 mass %, preferably 27.5 mass % to 35.5 mass %. If less than 25 mass %, then the contact concentration of the base to cellulose is less, such that even reactivity is not achieved, and if over 40 mass %, then the limit of the alkali solubility is exceeded, such that the base is not dissolved, and therefore even reactivity is also not achieved. Here, the concentration of the base based on water represents the ratio of the amount of the base in the reaction solvent based on the total amount of water and the base.

The amount of the reaction solvent is preferably 2.5 to 10 times the mass of cellulose, more preferably 4 to 8 times. If less than 2.5 times, then cellulose cannot be completely moist due to insufficient amount of the reaction solvent, and the slurry concentration during the solid-liquid reaction is too high, such that the load to the stirring blades of the reactor is greater, which is undesired. Moreover, if greater than 10 times, then the slurry concentration during the solid-liquid reaction is reduced, such that sufficient kneading effect cannot be achieved, and therefore the effective utilization rate of the expensive raw material, i.e., monochloroacetic acid, is reduced, and the running cost of recovering the reaction solvent is higher after the reaction is complete, which is undesired.

In the invention, when the alkali cellulose reaction is performed using the reaction solvent, 1/10 to 2/3 times of the mass in the total amount of the reaction solvent is picked up, and the amount of the base in the reaction solvent is set to an amount of 2 mass % or less of all of the base used, and then cellulose is immersed in the reaction solvent and is preferably stirred to swell (a moist appearance is considered as swelling in the following). As a result, before the alkali cellulose reaction is performed, cellulose can be swollen by a certain amount of the reaction solvent. Uneven reaction can be inhibited when the base is added, wherein the uneven reaction is caused by the sudden reaction from the contact between the base and cellulose. If the mass of the solvent during the swelling of cellulose is less than 1/10 times of the total amount of the reaction solvent, then the amount of the solvent is too little, such that cellulose cannot be sufficiently immersed, which is undesired. Moreover, if the mass of the solvent exceeds 2/3 times, then the alkali concentration dissolved by the amount of remaining 1/3 times of the solvent may be significantly higher, such that uneven reaction may be promoted when a base-dissolved solvent is added, which is undesired. Moreover, the base is not required in the solvent during the swelling of the cellulose, but a small amount of the base (2 mass % or less of all the base) is not counterproductive.

The immersion and stirring for the swelling of the cellulose is preferably performed at 5° C. to 25° C. for 20 minutes to 60 minutes. If less than 5° C., then the dissolved base is precipitated such that uniform growth of alkali cellulose is hindered. Moreover, if greater than 25° C., then the solvent cannot be sufficiently permeated into the cellulose core, which is undesirable. Moreover, if the time is less than 20 minutes, then the time is insufficient, such that the solvent cannot be readily permeated into the cellulose evenly. Moreover, although a time of over 60 minutes does not hinder the reaction, the general consensus is that the permeation is largely complete after 60 minutes.

Next, the remaining reaction solvent and base are added in the reaction system to perform an alkali cellulose reaction. The alkali cellulose reaction is preferably performed at 5° C. to 40° C. for 20 minutes to 60 minutes. If the temperature is less than 5° C. or greater than 40° C., then the reaction cannot be sufficiently performed. Moreover, if the time is less than 20 minutes, then the time is too short, and therefore the reaction is insufficient. Moreover, although a time of over 60 minutes does not hinder the reaction, in general, 60 minutes is enough to complete the reaction.

The cellulose is not particularly limited, and a general cellulose used in the art can be used. Examples of such cellulose can include, for instance: pulverized paper pulp, wood pulp (coniferous wood pulp composed of mainly coniferous trees (NBKP) and broadleaf wood pulp composed of mainly broadleaf trees (LBKP)), cotton linter pulp, and waste paper pulp. One or two or more of the raw material cellulose can be used. The hydroxide of an alkali metal can be used for the base. Although not particularly limited, specifically, the following can be used: lithium hydroxide, sodium hydroxide, potassium hydroxide . . . etc. These bases can be added after being dissolved in the reaction solvent, or added in solid or liquid form at the same time the reaction solvent is added or before or after the reaction solvent is added, and either of the methods can be used.

(2) Etherification Reaction Step

After the alkali cellulose reaction, an etherifying agent is added to perform an etherification reaction to complete the carboxymethylation reaction. At this point, to perform the reaction efficiently, during the etherification reaction, the excess base in moles is set to 0.2 moles to 0.5 moles per unit of an anhydroglucose of cellulose. The excess base in moles is preferably 0.24 moles to 0.34 moles. If less than 0.2 moles, then the carboxymethylation reaction may be insufficiently performed. If more than 0.5 moles, then salt metathesis reaction occurs to the monochloroacetic acid in the carboxymethylation reaction, and therefore the effective utilization rate is reduced such that the degree of polymerization of cellulose is reduced. As a result, the viscosity is reduced even more, which is undesirable.

Moreover, the amounts of the base and monochloroacetic acid are decided based on the mole balance for increasing the effective utilization rate of the agent. The number of moles of the excess base based on the etherifying agent, i.e., monochloroacetic acid in the carboxymethylation reaction is referred to as "excess base in moles". The excess base in moles can be calculated by formulas (1) and (2) below when sodium hydroxide is used as the base.

Excess base(g)=sodium hydroxide(g)−monochloroacetic acid(g)×0.847  formula (1)

(0.847=molecular weight of sodium hydroxide (2 moles)/molecular weight of monochloroacetic acid)

$$\text{Excess base in moles} = \frac{162 \times \text{excess base } (g)}{\text{Paper pulp } (g) \times 40} \quad \text{formula (2)}$$

(40: molecular weight of sodium hydroxide)

A general etherifying agent in the art can be used for the etherifying agent used for the carboxymethyl etherification of cellulose, such as monochloroacetic acid, sodium monochloroacetate, methyl monochloroacetate, ethyl monochloroacetate, and isopropyl monochloroacetate. In particular, from the perspective of the degree of availability of the raw material, monochloroacetic acid and sodium monochloroacetate are preferred.

The amount of the etherifying agent can be suitably decided based on the target degree of etherification of the carboxymethyl cellulose salt, and the specific preferred range of the amount of the etherifying agent is, for instance, 36 parts by mass to 166 parts by mass, preferably 44 parts by mass to 83 parts by mass based on 100 parts by mass of the paper pulp. If greater than 166 parts by mass, then the target degree of etherification tends to be exceeded, and if less than 36 parts by mass, then the target degree of etherification tends to not be achieved.

The etherifying agent is generally a solution formed by dissolving in a solvent and added in alkali cellulose. The mixed solvent of alcohol having a carbon number of 3 or less and water used in the alkali cellulose reaction is suitable for the solvent used here, and water or alcohol having a carbon number of 3 or less can also be used alone.

The concentration of the etherifying agent in the solution is, in general, preferably 50 mass % to 80 mass %, more preferably 55 mass % to 65 mass %. If less than 50 mass %, then the amount of the solution is more, which is undesired, and if greater than 80 mass %, then the following issues tend to occur: uneven reaction of the etherifying agent is promoted such that even etherification cannot be achieved, or the reaction rate of the etherifying agent is reduced . . . etc.

The temperature of the alkali cellulose when the etherifying agent is added is generally in the range of 10° C. to 50° C., preferably 20° C. to 40° C. If the temperature is to be maintained at 10° C. or less, then refrigeration is required, and therefore energy costs are increased, which is undesired, and if greater than 50° C., then the degree of etherification is reduced caused by salt metathesis reaction of the etherifying agent, which is undesired. The time needed is generally in the range of 30 minutes to 120 minutes, preferably 40 minutes to 90 minutes. When less than 30 minutes, the reaction of the etherifying agent is not performed such that the degree of etherification tends to be reduced, and if over 120 minutes, then the reaction time tends to be extended to no effect.

The addition of the etherifying agent is preferably: adding at an approximately fixed rate within the time needed for the addition. Dropwise addition can be performed when the etherifying agent in solution state is added.

(3) Neutralization Step

After the etherification reaction is complete, excess of the base is neutralized with acid such that the pH of the reaction mixture is neutral (pH=6.0 to 8.0). The pH is preferably 7.5. Moreover, after the etherification reaction is complete, the reaction mixture is preferably cooled to a temperature of 50° C. or less. The acid used in the neutralization step can be organic acid such as acetic acid, hydroxysuccinic acid, sulfanilic acid, formic acid, propionic acid, or citric acid, or inorganic acid such as hydrochloric acid, nitric acid, or sulfuric acid.

(4) Heating Step

The manufacturing method of the invention contains the following steps: removing the reaction solvent and adding a base to adjust the pH of the reaction mixture to 8.0 to 9.0 after the neutralization step is complete, and then performing a heat treatment at 40° C. to 70° C. for 30 minutes to 120 minutes. Preferably, the volatile component in the carboxymethyl cellulose salt is adjusted after the reaction solvent is removed such that the mass of the volatile component is 1 to 2 times that of the solid component.

The base can be the same base used in the (1) alkali cellulose reaction step and the (2) etherification reaction step. Moreover, the addition method of the base is not particularly limited, and the base is preferably added in aqueous state. The alkali concentration here is preferably 20 mass % to 50 mass %.

In the above steps, the pH is 8.0 to 9.0, preferably 8.0 to 8.5. If the pH is less than 8.0, then the solubility of the resulting carboxymethyl cellulose salt is worse, such that the solubility is decided by the particle size of the powder of the carboxymethyl cellulose salt, and if the pH exceeds 9.0, then the undesired situation in which the viscosity is reduced occurs.

In the above steps, the treatment temperature is 40° C. to 70° C., preferably 50° C. to 60° C. If less than 40° C., then the solubility of the resulting carboxymethyl cellulose salt is worse, such that the solubility is decided by the particle size of the powder of the carboxymethyl cellulose salt, and if greater than 70° C., then the issue of reduced viscosity occurs.

In the above steps, the treatment time is 30 minutes to 120 minutes, preferably 60 minutes to 90 minutes. If less than 30 minutes, then the solubility of the resulting carboxymethyl cellulose salt is worse, such that the solubility is decided by the particle size, and if greater than 120 minutes, then the undesired situation in which the viscosity is reduced occurs.

The reaction mixture (hereinafter crude carboxymethyl cellulose salt) from the completion of the neutralization step or the subsequent heating step is washed using, for instance, methanol, and then is dried and pulverized to obtain the target, i.e., carboxymethyl cellulose salt.

The pulverizing step can be performed by a mechanical impact pulverizer, and the pulverizer is represented by a pulverizer or pin mill made by Hosokawa Micron Incorporated. Other examples can include, for instance: fine impact mill or supermicron pulverizer (made by Hosokawa Micron Incorporated); sample mill, bantam mill, or atomizer (made by Seishin Enterprise Co., Ltd.); tornado mill (made by Japan Machine Equipment Co., Ltd); turbo mill (made by Turbine Industries Co., Ltd.); bevel impactor (made by Sugiyama Heavy Industries Co., Ltd). The (1) alkali cellulose reaction step, (2) etherification reaction step, and (3) neutralization step can be performed using a regular reactor used in an alkali cellulose reaction. To prevent the cellulose (paper pulp) put in the reactor from sticking to, for instance, the machine wall or lid of the reactor and falling during the reaction and becoming an unreacted component, the interior of the reactor is moisturized beforehand, which is preferable for achieving the object of the invention.

The viscosity of the carboxymethyl cellulose salt made by the manufacturing method of the invention is preferably greater than 1000 mPa·s when converted to the viscosity of 1% aqueous solution (1% solution) from anhydrate at 25° C. If the viscosity is 1000 mPa·s or less, then when the electrode paste is thickened and the paste is coated on the current collector, sufficient paste viscosity cannot be obtained, and the concentration of the carboxymethyl cellulose salt needs to be increased until the desired paste viscosity can be obtained. At this point, internal resistance is increased in response to the increase in the concentration of the carboxymethyl cellulose salt, and therefore the battery may be adversely affected.

The volume accumulation 50% particle size (hereinafter average particle size) of the carboxymethyl cellulose sodium salt made by the manufacturing method of the invention using isopropanol as the dispersion medium and measured using a laser diffraction particle size distribution meter is preferably 10 μm or more and 80 μm or less, more preferably 20 μm or more and 50 μm or less. When the average particle size is less than 10 μm, before the electrode active material is sufficiently dispersed, the carboxymethyl cellulose sodium salt is dissolved, and therefore the issue of insufficient dispersion occurs. If the dispersion time is extended to prevent the situation, then the issue in which the viscosity of the paste of the resulting electrode active material is reduced and the adhesion is also reduced occurs. When the average particle size is greater than 80 μm, the issue of insufficient dissolution of carboxymethyl cellulose sodium salt occurs. If the dispersion time is extended to prevent the situation, then the viscosity of the paste of the resulting electrode active material is reduced, and therefore the adhesion is also reduced.

The degree of etherification of the carboxymethyl cellulose sodium salt made by the manufacturing method of the invention is preferably 0.55 to 0.85, more preferably 0.6 to 0.8. When the degree of etherification is less than 0.55, the aqueous solution tends to be turbid. Moreover, when the degree of etherification is greater than 0.85, since excess etherifying agent is unnecessarily used, costs are increased, which is undesired.

The electrode for a nonaqueous electrolyte secondary battery of the invention is formed by the following method: dry mixing the carboxymethyl cellulose salt obtained by the manufacturing method above and an electrode active material, and then adding water to disperse the electrode active material in the water, and adding a binder to form an electrode paste, and coating the electrode paste on a current collector.

The content of the carboxymethyl cellulose salt of the electrode paste is preferably 0.1 mass % to 4.0 mass % based on the solid component of the electrode paste.

The electrode active material is not particularly limited as long as it is a general electrode active material used in the electrode for a nonaqueous electrolyte secondary battery. Specifically, the negative electrode active material can include: graphite materials such as graphite (natural graphite, artificial graphite), coke, and carbon fiber; elements that can form an alloy with lithium such as aluminum (Al), silicon (Si), tin (Sn), silver (Ag), bismuth (Bi), magnesium (Mg), zinc (Zn), indium (In), germanium (Ge), lead (Pb), titanium (Ti); compounds containing the elements that can form an alloy with lithium; a complex compound formed by the elements that can form an alloy with lithium and the compounds above, and carbon and/or the graphite material; nitride containing lithium. The positive electrode active material is preferably a LiMexOy (Me represents transition metal, containing at least one of nickel (Ni), cobalt (Co), and manganese (Mn); x and y represent any number) positive electrode active material. The LiMexOy positive electrode active material is not particularly limited, and is preferably a $LiMn_2O_4$, $LiCoO_2$, or $LiNiO_2$ positive electrode active material. The $LiMn_2O_4$, $LiCoO_2$, or $LiNiO_2$ positive electrode active material can include, for instance: a compound having $LiMnO_2$, $LiMn_2O_4$, $LiCoO_2$, or $LiNiO_2$ as the main skeleton and formed by substituting with various metal elements.

The content of the electrode active material in the solid component of the electrode paste is generally 90 mass % to 98 mass %, preferably 91 mass % to 99 mass %, and more preferably 92 mass % to 99 mass %.

The binder is not particularly limited as long as it is a general binder used in the electrode for a nonaqueous electrolyte secondary battery. Specifically, the binder of the electrode composition for a negative electrode can include, for instance, a synthetic rubber binder. The synthetic rubber binder can include 1 or more from the group consisting of the following: styrene-butadiene rubber (SBR), nitrile-butadiene rubber, methyl methacrylate-butadiene rubber, chloroprene rubber, carboxyl modified styrene-butadiene rubber, and the latices of these synthetic rubbers. In particular, styrene-butadiene rubber (SBR) is preferred. Moreover, other than the synthetic rubber binders for the binder for the negative electrode, the binder for the electrode composition for the positive electrode can further include, for instance, polytetrafluoroethylene (PTFE), wherein polytetrafluoroethylene (PTFE) is preferred.

In particular, the content of the binder is generally 1 mass % to 10 mass %, preferably 1 mass % to 6 mass %, and more preferably 1 mass % to 2 mass % based on the solid component of the electrode paste.

The electrode paste for the positive electrode preferably contains a conductive material. If the electrode paste contains a conductive material, then the properties of the resulting positive electrode can be improved. Moreover, the conductive material can ensure the conductivity of the positive electrode. The conductive material can include, for instance: a conductive material formed by mixing 1 or 2 or more of a carbon material such as carbon black, acetylene black, or graphite. In particular, carbon black is preferred.

The current collector is not particularly limited as long as it is a current collector used in the electrode for a nonaqueous electrolyte secondary battery. Specifically, the current collector for the negative electrode active material can include, for instance: stainless steel, nickel, copper, titanium, or carbon; or a current collector formed by a carbon, nickel, titanium, or silver attachment treatment on the stainless steel surface.

The material of the current collector for the positive electrode can include, for instance, a metal such as aluminum or stainless steel, and aluminum is preferred. The shape of the current collector substrate can include a net, stamped metal, foam metal, or foil processed into a sheet, and foil processed into a sheet is preferred.

The water can be added in an amount that can adjust the electrode paste to a suitable viscosity for coating. The viscosity of the electrode paste suitable for coating (25° C., brookfield viscometer LVDVII+, rotor number 6, 60 rpm) is, for instance, 1000 mPa·s to 20000 mPa·s, preferably 2000 mPa·s to 10000 mPa·s, and more preferably around 3000 mPa·s to 8000 mPa·s.

The method of dry mixing the carboxymethyl cellulose salt and the electrode active material is not particularly limited, and a common method can be used, such as a method using a mechanical means such as a mixer, and from the perspective of convenience, mixing can also be performed via the following method: a method in which the two particles are filled in a plastic container (such as a bag made from polyethylene) and vibrated. The mixing time can be suitably selected based on the mixing method, such as 10 seconds to 2 hours, preferably 30 seconds to 1 hour, and more preferably around 1 minute to 30 minutes.

The resulting dry mixture can be mixed with water to form an electrode paste. The mixing method of the dry mixture and water can include a common stirring means, such as a mechanical stirring means (such as a stirring rod or stirrer) or an ultrasonic dispersing machine.

Among these stirring means, from the perspective of readily achieving uniform stirring, a mixer (stirring machine) having a rotary vane as the stirrer is preferred. The mixer can include, for instance, a common mixer such as a homogenizing mixer, homogeneous dispersion machine, Henschel mixer, Banbury mixer, ribbon mixer, or V mixer, and from the perspective of kneading high-viscosity materials, a biaxial kneader or a planetary mixer . . . etc. can also be used. Since the carboxymethyl cellulose salt used is preferably 1000 mPa·s or more, a mixer with high-speed cutting cannot sufficiently disperse the electrode active material, and therefore a biaxial kneader or a planetary mixer . . . etc. capable of kneading is preferred.

The method of coating the electrode paste on the current collector is not particularly limited, and a common method can be used, such as: roll coater, air-knife coater, blade coater, rod coater, reverse coater, bar coater, comma coater, dipping-squeeze coater, die coater, gravure coater, micro-gravure coater, or silk screen coater. The drying method is not particularly limited, and in addition to natural drying, hot air, far-infrared, or microwave can also be used.

The nonaqueous electrolyte secondary battery of the invention has the electrode for a nonaqueous electrolyte secondary battery of the invention.

The structure of the nonaqueous electrolyte secondary battery of the invention can include a common structure as long as it has the electrode for a nonaqueous electrolyte secondary battery, and can be formed by, for instance, an electrode for a nonaqueous electrolyte secondary battery, an isolation film, and an electrolyte.

The isolation film can be formed by, for instance, a polyolefin-based porous film or a carbon insulation film, and the polyolefin-based porous film is, for instance, nonwoven fabric made of porous polypropylene or nonwoven fabric made of porous polyethylene.

The electrolyte can be, for instance, a nonaqueous electrolyte formed by dissolving an electrolyte (lithium salt such as $LiPF_6$, $LiClO_4$, $LiBF_4$, $LiAsF_6$, $LiCl$, or $LiI$) in an organic solvent (such as propyl carbonate, butyl carbonate, ethyl carbonate, or diethyl carbonate).

EXAMPLES

In the following, the invention is described in more detail based on examples, but the invention is not limited to these examples.

1. Analyzing and Measuring Method of Carboxymethyl Cellulose Sodium Salt

[Determination of Moisture (Dry Reduced Weight)]

1 g to 2 g of a sample of the carboxymethyl cellulose sodium salt was accurately measured in a weighing bottle and dried at a constant temperature oven at 105±2° C. for 4 hours and then cooled in a desiccator. Next, the lid was closed and the weight was measured, and the moisture (dry reduced weight) was calculated based on the reduced amount and formula (3) below.

$$\text{Dry reduced weight (\%)} = \frac{\text{Reduced amount }(g)}{\text{Sample }(g)} \quad \text{formula (3)}$$

[Determination of Salt]

About 1 g of a sample of carboxymethyl cellulose sodium salt (anhydrate) was accurately measured into a 300 ml beaker, and about 200 ml of water was added to dissolve the sample. Potentiometric titration was performed using 0.1 mol/l of silver nitrate, and the salt was calculated based on formula (4) below and the desired amount thereof.

Salt (%)=0.1 mol/l silver nitrate(ml)×f×0.585÷sample anhydrate(g)  formula (4)

(f: 0.1 mol/l titer of silver nitrate)

[Determination of Degree of Etherification]

0.5 g to 0.7 g of a sample (anhydrate) of the carboxymethyl cellulose sodium salt was accurately measured and covered with filter paper and then ashed in a ceramic crucible. After cooling, the product was moved to a 500 ml beaker, and about 250 ml of water was added. Next, 35 ml of sulfuric acid (0.05 mol/1) was added with a pipette, and the mixture was boiled for 30 minutes. The mixture was cooled, and a phenolphthalein indicator was added, and anti-titration was performed on the excess acid using 0.1 mol/l potassium hydroxide aqueous solution, and then the degree of etherification (degree of substitution) was calculated based on formulas (5) and (6) below.

$$\text{Degree of etherification} = \frac{162 \times A}{10000 - 80A} \quad \text{formula (5)}$$

$$A = \frac{af - bf^1}{\text{sample anhydrate }(g)} - \text{alkalinity(or + acidity)} \quad \text{formula (6)}$$

(A: ml number of 0.05 mol/l sulfuric acid consumed by the base of the bond in 1 g of sample; a: ml number used in 0.05 mol/l sulfuric acid; f: titer of 0.05 mol/l sulfuric acid; b: titration ml number of 0.1 mol/l potassium hydroxide, $f^1$: titer of 0.1 mol/l potassium hydroxide)

[Determination of 0.5% pH]

1 g of a sample (in anhydrate equivalents) of the carboxymethyl cellulose sodium salt was weighed, and 199 ml of water was added and the mixture was evenly stirred. Next, the mixture was left alone until it became a uniform paste, and then was measured (the temperature was set to 25° C.) using a pH meter having a glass electrode.

In the above steps, the water used is pure water made by an ion-exchange method. Moreover, the following water was used: water having a resistivity of $2 \times 10^4 \Omega \cdot m$ in (25° C.) that is boiled in a reactor in which a based is not dissolved for 5 minutes to 10 minutes and then cooled by a method in which gas is not absorbed to remove $CO_2$ gas dissolved in water.

[Determination of Viscosity]

(Preparation of Solution) About 2.2 g of a sample of carboxymethyl cellulose sodium salt was accurately weighed in a 300 ml Erlenmeyer flask provided with a stopper, and the water needed was added based on formula (7).

Sample(g)×(99−moisture(%))=water needed(g)  formula (7)

(Determination)

The aqueous solution of the carboxymethyl cellulose sodium salt was left alone overnight and then stirred using a magnetic stirrer for about 5 minutes to form a complete solution. Next, the solution was moved in a reactor having an opening diameter of about 4.5 mm and a height of about 145 mm and provided with a lid, and the reactor was placed in a thermostatic bath at 25±0.2° C. for 30 minutes. The solution having a solution temperature of 25° C. was slowly stirred using a glass rod. Moreover, a suitable rotor and protective frame of a BM viscometer were installed, the rotor was rotated, and the scale value after 3 minutes of rotation was read (number of rotations was 60 rpm). Moreover, the coefficients of Table 1 were multiplied based on the rotor number and number of rotations of the rotors, and the viscosity was calculated based on formula (8) below.

Viscosity=scale number read×coefficient(mPa·s)  formula (8)

TABLE 1

| Rotor | 60 rotations (rpm) |
|---|---|
| No. 1 | 1 |
| No. 2 | 5 |
| No. 3 | 20 |
| No. 4 | 100 |

[Determination of Particle Size]

The dispersion medium was set to isopropanol, and measurement was performed via a laser diffraction particle size distribution measurement device (Master-sizer 2000 made by Malvern Instruments, Ltd.).

[Determination of Microcolloid Index]

0.1 g of a sample of carboxymethyl cellulose sodium salt was dissolved in 1000 ml of distilled water (3 hours of continuous stirring), and vacuum filtration (−100 mmHg) was performed on a 200-mesh polyester mesh. Next, slight washing was performed via distilled water, and then aqueous colloid remaining on the mesh was weighed with the mesh, and the difference in mass from the mesh used in the same operation with only distilled water was measured, and the microcolloid index was calculated based on formula (9) below.

$$\text{Microcolliod index} = \frac{(\text{weight of mesh containing colloid}) - (\text{weight of wet mesh})}{\text{sample (anhydrate) weight}} \quad \text{formula (9)}$$

[Determination of Solidification]

95 g of 85% glycerol aqueous solution was placed in a 200 ml high beaker, and 5 g of carboxymethyl cellulose sodium salt was provided while stirring at 150 rpm using a stirring device, and the stirring device was formed by installing anchor mixing blades on a three-one motor. At this point, the time of carboxymethyl cellulose sodium salt dissolution and glycerol aqueous solution solidification was measured.

2. Preparation of Carboxymethyl Cellulose Sodium Salt

Example 1

An alkaline solution was made, and the alkaline solution was formed by dissolving 110 g of sodium hydroxide in 1000 g of a solvent for which the mixing ratio of isopropanol and water was adjusted to 80:20 (mass ratio). The alkaline solution was placed in a biaxial kneading reactor having a capacity of 5 L, and chippy raw cellulose (linter pulp: HVE (product name) made by Buckeye Technologies) was added over about 5 minutes while stirring. The mixture was stirred at 25° C. for 50 minutes to perform an alkali cellulose reaction.

After the reaction, the reaction mixture was cooled to 30° C., and monochloroacetic acid solution was adjusted to 25° C., wherein the monochloroacetic acid solution was formed by dissolving 100 g of monochloroacetic acid in a reaction solvent (a mixture of 80 g of isopropanol and 20 g of water), and then the monochloroacetic acid solution was added in the alkali cellulose in the reactor over 10 minutes. Next, the temperature was gradually increased over 20 minutes to 78° C. The mixture was left at 78° C. for 90 minutes to perform an etherification reaction.

After the reaction was complete, the mixture was cooled until 50° C. or less, and the pH of excess sodium hydroxide was adjusted to 7.5 using 50 mass % of acetic acid aqueous solution.

Next, vaporization recovery was performed on the reaction solvent of the reaction mixture using a vacuum filter to reduce the amount of the volatile component in the crude carboxymethyl cellulose sodium salt to 1 to 2 times the amount. Moreover, the volatile component was roughly 33% to 50%.

After the reaction solvent was recycled, the same kneading machine was used, sodium hydroxide was added in the reactant, and the pH of the crude carboxymethyl cellulose sodium salt was adjusted to 8.1, and then the mixture was heated at 50° C. to 60° C. for 60 minutes.

Next, the crude carboxymethyl cellulose sodium salt was removed, and water-containing methanol with a water content of 20 wt % 10 times (mass ratio) the crude carboxymethyl cellulose sodium salt was added to stir and clean for 30 minutes to remove by-products such as salt.

After stirring and cleaning, vaporization recovery was performed on the water-containing methanol using a vacuum filter, and crude carboxymethyl cellulose sodium salt was recovered. The operation was repeated twice, and then the crude carboxymethyl cellulose sodium salt was dried and pulverized (pulverizer made by Hosokawa Micron Incorporated), and powdered carboxymethyl cellulose sodium salt was obtained using an 80-mesh standard mesh.

Example 2

The pH of the reaction solvent after recovery was set to 8.5, the heating time was set to 90 minutes. In addition, the carboxymethyl cellulose sodium salt was obtained using the same method as example 1.

Example 3

The amount of the mixed solvent of isopropanol and water of the alkali cellulose reaction was changed to 1400 g, the amount of sodium hydroxide was changed to 105 g, and the pH of the reaction solvent after recovery was changed to 8.4. In addition, the carboxymethyl cellulose sodium salt was obtained using the same method as example 1.

Comparative Example 1

The amount of the sodium hydroxide of the alkali cellulose reaction was changed to 95 g, the pH of the reaction solvent was changed to 7.5 after recovery, and the heating time was changed to 15 minutes. In addition, the carboxymethyl cellulose sodium salt was obtained using the same method as example 1.

Comparative Example 2

The amount of the sodium hydroxide of the alkali cellulose reaction was changed to 100 g, the pH of the reaction solvent was changed to 8.5 after recovery, and the heating time was changed to 90 minutes. In addition, the carboxymethyl cellulose sodium salt was obtained using the same method as example 1.

Comparative Example 3

The amount of the mixed solvent of isopropanol and water of the alkali cellulose reaction was changed to 1400 g, the amount of sodium hydroxide was changed to 105 g, and the pH of the reaction solvent was changed to 8.2 after recovery, and the heating time was changed to 15 minutes. In addition, the carboxymethyl cellulose sodium salt was obtained using the same method as example 1.

The manufacturing conditions and analysis/measurement results of the carboxymethyl cellulose sodium salt made by the method above are shown in Table 2 to Table 3 below.

TABLE 2

|  | Amount of solvent g | Amount of NaOH g | Concentration of NaOH % | Excess NaOH Moles | pH after recovery | Heating time Minutes |
|---|---|---|---|---|---|---|
| Example 1 | 1000 | 110 | 35.5 | 0.34 | 8.1 | 60 |
| Example 2 | 1000 | 110 | 35.5 | 0.34 | 8.5 | 90 |
| Example 3 | 1400 | 105 | 27.3 | 0.24 | 8.4 | 60 |
| Comparative example 1 | 1000 | 95 | 32.2 | 0.04 | 7.5 | 15 |
| Comparative example 2 | 1000 | 100 | 33.3 | 0.14 | 8.5 | 90 |
| Comparative example 3 | 1400 | 105 | 27.3 | 0.24 | 8.2 | 15 |

TABLE 3

|  | Moisture % | Salt % | Degree of etherification | 0.5% pH | Viscosity mPa·s | Microcolloid index |
|---|---|---|---|---|---|---|
| Example 1 | 9.5 | 0.15 | 0.73 | 7.1 | 6960 | 18 |
| Example 2 | 7.3 | 0.23 | 0.70 | 7.1 | 2210 | 36 |
| Example 3 | 9.0 | 0.13 | 0.69 | 7.1 | 8100 | 76 |
| Comparative example 1 | 7.2 | 0.03 | 0.71 | 6.8 | 6920 | 470 |
| Comparative example 2 | 8.3 | 0.18 | 0.70 | 6.9 | 2400 | 120 |
| Comparative example 3 | 7.3 | 0.08 | 0.71 | 7.1 | 6760 | 318 |

3. Grading of Carboxymethyl Cellulose Sodium Salt

To confirm the affect to dissolution rate by the average particle size, the carboxymethyl cellulose sodium salts of example 1 and comparative example 1 having the particle sizes recited in Table 4 below were obtained by sieving using a standard mesh.

The carboxymethyl cellulose sodium salts of examples 2 and 3 and comparative examples 2 and 3 are carboxymethyl cellulose sodium salts having the particle sizes recited in Table 4 below pulverized by a counter jet mill (made by Hosokawa Micron Incorporated) and graded according the above.

The carboxymethyl cellulose sodium salt was graded, and the results of various evaluations thereof are shown in Table 4 below.

TABLE 4

|  | Grading | Moisture % | Viscosity mPa·s | Particle diameter μm | Microcolloid index | Curing time Seconds |
|---|---|---|---|---|---|---|
| Example 1-① | 80-mesh sieving | 9.5 | 6960 | 77.4 | 18 | 420 |
| Example 1-② | 150-mesh sieving | 9.5 | 7140 | 53.8 | 18 | 345 |
| Example 1-③ | 200-mesh sieving | 9.5 | 7240 | 32.2 | 20 | 362 |
| Example 1-④ | 400-mesh sieving | 9.5 | 7080 | 22.7 | 19 | 337 |
| Example 1-⑤ | 500-mesh sieving | 9.5 | 6260 | 14.7 | 16 | 224 |
| Example 2-① | 80-mesh sieving | 7.3 | 2210 | 80.2 | 36 | 405 |
| Example 2-② | Jet stream pulverizer | 7.3 | 2060 | 45.0 | 36 | 359 |
| Example 3-① | 80-mesh sieving | 9.0 | 8100 | 78.8 | 76 | 440 |
| Example 3-② | Jet stream pulverizer | 6.2 | 6400 | 35.7 | 76 | 330 |
| Comparative example 1-① | 80-mesh sieving | 6.0 | 6920 | 79.8 | 470 | 1200 |
| Comparative example 1-② | 200-mesh sieving | 6.0 | 7060 | 34.9 | 376 | 345 |
| Comparative example 1-③ | 400-mesh sieving | 6.0 | 6800 | 24.0 | 403 | 170 |
| Comparative example 1-④ | 500-mesh sieving | 6.0 | 6220 | 17.7 | 446 | 80 |
| Comparative example 2-① | 80-mesh sieving | 7.1 | 2400 | 76.0 | 120 | 860 |
| Comparative example 2-② | Jet stream pulverizer | 6.4 | 2130 | 36.3 | 129 | 350 |
| Comparative example 3-① | 80-mesh sieving | 8.3 | 6760 | 79.4 | 318 | 1080 |
| Comparative example 3-② | Jet stream pulverizer | 5.6 | 5920 | 28.5 | 272 | 240 |

4. Evaluation of Battery Properties

The battery properties of the carboxymethyl cellulose sodium salt were evaluated.

[Fabrication of Electrode]

98 g of a commercial graphite negative electrode active material (particle size: 13.8 nm; specific surface area: 2.9 m²/g) and 1 g of carboxymethyl cellulose sodium salt were placed in a planetary pulverizer (made by Primix Corporation, product model: HIVIS MIX 2P-03) and stirred for 10 minutes. Water was added at a solid content of 60% of the electrode paste and stirring was performed for 30 minutes, and water was added again at a final solid content of 50%, and stirring was performed for 30 minutes. Then, 2 g of a binder (1 g in solid content equivalents) was added, and degassing was performed at −100 mmHg while stirring for 10 minutes to obtain an electrode paste.

The resulting electrode paste was coated on a 10 μm copper foil in a thickness of 140 μm using an applicator, and pre-drying was performed immediately at 100° C., and then drying was performed at 130° C. under reduced pressure for 8 hours. Next, the dried electrode was rolled to obtain a negative electrode of 8 mg/cm² having an electrode density of 1.50 g/cm³.

[Determination of Viscosity]

The viscosity of the electrode paste was measured at 25° C. and 60 rpm using a viscometer made by Brookfield Company.

[Evaluation of Electrode Surface Condition]

The evaluation can be set to "C" when the streaks or pinholes on the electrode coating surface clearly visible to the naked eye, "B" when a plurality of spots is confirmed on the coated electrode from several meters, and "A" when spots are not seen at all on the coated electrode from several meters.

[Determination of Adhesion]

The electrode was cut into strips of 1.8 cm×15 cm as a test piece, and the active material was placed facing up and fixed. A transparent tape was attached to the active material layer surface of the test piece, and then the transparent tape was pulled from one end of the test piece toward the 180-degree direction at a speed of 50 mm/minute and peeled off, and the stress at this point was measured. The measurement was performed 3 times and the average value thereof was obtained as the adhesion.

The evaluation results are shown in Table 5 below.

TABLE 5

| Grading | | Viscosity mPa · s | Electrode surface condition | Adhesion N/cm |
|---|---|---|---|---|
| Example 1-① | 80-mesh sieving | 8400 | A | 0.163 |
| Example 1-② | 150-mesh sieving | 7340 | A | 0.158 |
| Example 1-③ | 200-mesh sieving | 7120 | A | 0.155 |
| Example 1-④ | 400-mesh sieving | 6600 | A | 0.156 |
| Example 1-⑤ | 500-mesh sieving | 5400 | A | 0.135 |
| Example 2-① | 80-mesh sieving | 2900 | A | 0.115 |
| Example 2-② | Jet stream pulverizer | 2760 | A | 0.116 |
| Example 3-① | 80-mesh sieving | 9100 | A | 0.162 |
| Example 3-② | Jet stream pulverizer | 6680 | A | 0.158 |
| Comparative example 1-① | 80-mesh sieving | 8370 | C | 0.162 |
| Comparative example 1-② | 200-mesh sieving | 7530 | A to B | 0.155 |
| Comparative example 1-③ | 400-mesh sieving | 4860 | A | 0.122 |
| Comparative example 1-④ | 500-mesh sieving | 4200 | A | 0.121 |
| Comparative example 2-① | 80-mesh sieving | 4000 | C | 0.133 |
| Comparative example 2-② | Jet stream pulverizer | 2760 | A to B | 0.110 |
| Comparative example 3-① | 80-mesh sieving | 8800 | C | 0.174 |
| Comparative example 3-② | Jet stream pulverizer | 6030 | A to B | 0.143 |

The carboxymethyl cellulose sodium salts of examples 1 to 3 are within a range of 0.6 to 0.8 for the degree of etherification, and the 1% viscosities thereof are 1000 mPa·s or more as shown in Table 4 and Table 5, and therefore it is known that an electrode paste can be made, wherein even if the particle sizes are different, stable adhesion to the current collector surface is also displayed. In comparison, during the etherification reactions of comparative examples 1 and 2, the excess base per unit of the anhydroglucose is respectively 0.04 and 0.14 which is less than 0.20. Therefore, the result is that, the solubility is affected with different particle sizes of the resulting carboxymethyl cellulose sodium salt, such that difference in the electrode paste viscosity exists and difference in adhesion also exists.

The heating time of comparative example 3 is 15 minutes which is shorter. Therefore, the result is that, the solubility is affected with different particle sizes of the resulting carboxymethyl cellulose sodium salt, such that difference in the electrode paste viscosity exists and difference in adhesion also exists.

INDUSTRIAL APPLICABILITY

The carboxymethyl cellulose salt obtained by the manufacturing method of the invention is effective as an adhesive to adhere an electrode active material on the electrode of a nonaqueous electrolyte secondary battery, wherein the nonaqueous electrolyte secondary battery is used in an electronic equipment, in particular portable devices such as mobile phones, PDAs, and notebook computers.

What is claimed is:

1. A manufacturing method of a carboxymethyl cellulose salt for an electrode of a nonaqueous electrolyte secondary battery in which an etherification reaction is performed after an alkali cellulose reaction of a base and a cellulose, characterized in that the following steps are comprised:
    (1) an alkali cellulose reaction step in which a mixed solvent having a mixing ratio (a mass ratio) of 75:25 to 95:5 of an alcohol having a carbon number of 3 or less and a water is used, and a concentration of the base to the water is 25 mass % to 40 mass %;
    (2) an etherification reaction step in which a reaction is carried out under an excess base of 0.2 moles to 0.5 moles per unit of an anhydroglucose of the cellulose;
    (3) a neutralization step in which an acid is added after the etherification reaction is complete to adjust a pH of the reaction mixture to 6.0 to 8.0; and
    (4) a heating step in which the mixed solvent is removed after the neutralization step is complete, and a base is added to adjust the pH of the reaction mixture to 8.0 to 9.0, and then a heat treatment is performed at 40° C. to 70° C. for 30 minutes to 120 minutes.

2. The manufacturing method of a carboxymethyl cellulose salt for an electrode of a nonaqueous electrolyte secondary battery of claim 1, characterized in that the mixing ratio (the mass ratio) of the alcohol having a carbon number of 3 or less and the water is 80:20;
the concentration of the base to the water is 27.3 mass % to 35.5 mass %;
the excess base per unit of the anhydroglucose is 0.24 moles to 0.34 moles;
in the neutralization step, the pH is adjusted to 7.5;
in the heating step, a treatment temperature is 50° C. to 60° C. and the treatment time is 60 minutes to 90 minutes; and
the pH in the heating step is 8.0 to 8.5.

3. An electrode for a nonaqueous electrolyte secondary battery, characterized in that the electrode for a nonaqueous electrolyte secondary battery is formed by the following method: dry mixing the carboxymethyl cellulose salt obtained by the manufacturing method of claim 1 and an electrode active material, then adding water to disperse the electrode active material in the water, and adding a binder to form an electrode paste, and then coating the electrode paste on a current collector.

4. A nonaqueous electrolyte secondary battery, characterized by having the electrode for a nonaqueous electrolyte secondary battery of claim 3.

* * * * *